(12) United States Patent
Lai

(10) Patent No.: US 7,322,712 B2
(45) Date of Patent: Jan. 29, 2008

(54) BOTTOM-LIGHTING MODULE

(75) Inventor: Ching-Kun Lai, Chang Hua Hsien (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/348,454

(22) Filed: Feb. 7, 2006

(65) Prior Publication Data
US 2006/0198131 A1      Sep. 7, 2006

(30) Foreign Application Priority Data
Mar. 3, 2005    (TW) ............................... 94106379 A

(51) Int. Cl.
*G01D 11/28*      (2006.01)
(52) U.S. Cl. ........................................ 362/29; 362/225
(58) Field of Classification Search ................. 362/29, 362/30, 225, 260, 294, 373, 609, 614, 623, 362/632, 633, 634
See application file for complete search history.

(56) References Cited

U.S. PATENT DOCUMENTS

| | | | | |
|---|---|---|---|---|
| 5,726,722 A | * | 3/1998 | Uehara et al. | ............... 362/225 |
| 6,814,456 B1 | * | 11/2004 | Huang et al. | ................. 362/30 |
| 2006/0098457 A1 | * | 5/2006 | Chen et al. | ................. 362/632 |

* cited by examiner

*Primary Examiner*—Y. My Quach-Lee
(74) *Attorney, Agent, or Firm*—Birch, Stewart, Kolasch & Birch, LLP

(57) ABSTRACT

The provided bottom-lighting module comprises a bezel, a protrusion and at least one lamp. The bezel has at least one aperture with a first circumference and a second circumference. The bezel comprises a main body and at least one inclined wall extending upward from an edge of the main body. The protrusion is formed on the outer side of the bezel corresponding to the at least one aperture. Part of the circumference of the protrusion corresponds to the first circumference of the at least one aperture. At least one lamp is disposed on the main body of the bezel.

17 Claims, 6 Drawing Sheets

BOTTOM-LIGHTING MODULE

BACKGROUND OF THE INVENTION (1) Field of the Invention

The present invention generally relates to a bottom-lighting module, which provides backlight source to a display panel, and particularly relates to a bottom-lighting module with excellent heat sink ability.

(2) Description of the Prior Art

A Liquid Crystal Display (LCD) has been widely applied in notebook laptop, mobile phone, digital camera, video camera, PDA and other portable digital electronically products. Other than these small-sized portable products, the LCD inventing technology within large-sized products has been improved in great deal as well. For instance, desktop LCD monitor is replacing the traditional Cathode Ray Tube (CRT) monitor. LCD television with its light weight and reduced size, especially the thickness, are having huge competition with traditional television. A panel, or a liquid crystal panel, is an essential unit of the whole LCD. The panel itself does not generates light but modulates the transmittance of a backlight source, so as to present different gray levels. Hence, the backlight source is also an important element of the LCD. Among the various kinds of backlight source, a bottom-lighting module is usually implemented for larger-sized (such as bigger than 20') LCD.

Referring to FIG. 1, it illustrates a cross section view of a prior bottom-lighting module. Within a LCD, a bottom-lighting module 10 is disposed right underneath a panel 12. The bottom-lighting module 10 includes a plurality of lamp 14, a diffuser plate 16 and a bezel 20. As shown in FIG. 1, in bottom-lighting module 10, light is provided by the plurality of lamp 14, which are arranged horizontally to each other and located underneath the panel 12. "Bottom-lighting module 10" thus picks up its name. The diffuser plate 16, located in between the plurality of lamp 14 and the panel 12, is needed for diffusing the light coming from beneath, so as to provide a more evenly distributed light to the panel 12. Above the diffuser plate 16, a plurality of optical film 18, such as a lower diffuser film, a lower brightness enhancement film, a upper brightness enhancement film and a upper diffuser film, is usually disposed to increase the overall light evenness and brightness.

Bezel 20, disposed underneath diffuser plate 16, includes a main body 201 and a plurality of inclined wall 203. For large-sized LCD, bezel 20 is usually made of metal material by punch machining processes. The plurality of inclined wall 203 supports the diffuser plate 16. The plurality of lamp 14 is disposed on the main body 201. However, because the plurality of lamp 14 is the main heat source of the bottom-lighting module 10, it is usually not in touch with the main body 201. Instead, lamp supporters (not shown in FIG. 1) are disposed to hold the plurality of lamp 14. Furthermore, in order to utilize the light generated by the plurality of lamp 14 more effectively, a reflecting plate (not shown in FIG. 1) is disposed on the surface of the bezel 20. Other times, applying light-reflecting materials on the surface of the bezel 20 is another typical prior arts, in same results, the light capable of being more effectively utilized.

The diffuser plate 16 and the bezel 20 shown in FIG. 1 often form a closed room-space. Ought to be thin enough to survive in the market, the thickness of the bottom-lighting module 10 is reduced as thin as possible, the above mentioned room-space meant to be very limited. As mentioned above, bottom-lighting module 10 is often used in large-sized LCD product, which needs relatively large amount of lamps 14 to present efficient brightness. Nevertheless, except generating light, the plurality of lamp 14 also serves as heat source in the bottom-lighting module 10. As a result, heat generated from these large amount of lamps 14 particularly tends to be accumulated in the closed room space and hardly to be removed.

While an LCD product is operated, especially exceeding a long period of time, the temperature could be increased dramatically over the area near lamp 14. This not only affects the function of LCD panel 12, causing the deterioration of display quality (i.e. some part of the displayed image turns out blurry and smudgy), but it could even decrease the life time of many kinds of internal element within the LCD product. As the tendency of the LCD products that: 1) growing to bigger sizes/scales; 2) improving displaying brightness both require more lamps 14 in a LCD product, an important challenge to the present technologies is to improve the heat sink ability of the bottom-lighting module, so as to enhance display quality, especially a remaining display quality, and to elongate the lifetime of all kinds of element in the LCD product.

SUMMARY OF THE INVENTION

An objective of the present invention is to provide a bottom-lighting module with high heat sink ability.

Another objective of the present invention is to provide a bottom-lighting module having a maintaining display quality during a long operated duration.

Another objective of the present invention is to elongate life time of the internal elements of the bottom-lighting module.

The provided bottom-lighting module comprises a bezel, a protrusion and at least one lamp. The bezel has at least one aperture with a first circumference and a second circumference. The bezel comprises a main body and at least one inclined wall extending upward from an edge of the main body. The protrusion is formed on the outer side of the bezel corresponding to the at least one aperture. Part of the circumference of the protrusion corresponds to the first circumference of the at least one aperture. At least one lamp is disposed on the main body of the bezel. By these, an air-convecting tunnel, which is constructed by the second circumference, the protrusion, the first circumference and the second aperture, is capable of removing the heat within the bottom-lighting module with a remarkable efficiency.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and in which.

DETAILED DESCRIPTION OF THE PREFERRED EMBODIMENTS

Figure 1:
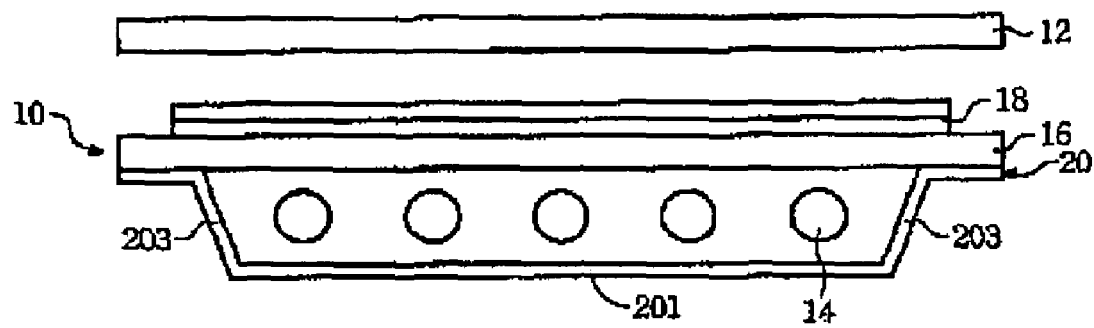
FIG. 1 illustrates a cross section view of a prior bottom-lighting module.
Figure 2:
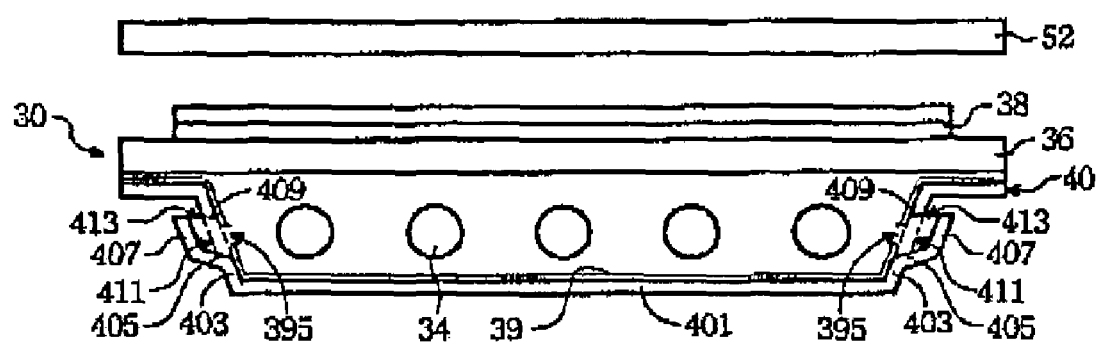
FIG. 2 is a cross-section view of the present bottom-lighting module.

Referring to FIG. 2, it is a cross-section view of the present bottom-lighting module. While being employed in a display product, the bottom-lighting module 30 is disposed right underneath a display panel 52, such as a liquid crystal panel.

In bottom-lighting module 30, light is provided by the plurality of lamp 34, which is arranged horizontally to each other and located underneath the panel 52. The diffuser plate 36, located in between the plurality of lamp 34 and the panel 52, is needed for diffusing the light coming from beneath, so as to provide a more evenly distributed light to the panel 52. Above the diffuser plate 56, a plurality of optical film 38, such as a lower diffuser film, a lower brightness enhancement film, a upper brightness enhancement film and a upper diffuser film, is disposed to increase the overall light evenness and brightness of the bottom-lighting module 30. The disposed order and the selected type of mentioned plurality of optical film 38 are variable during individual embodiments.

A bezel 40, which includes a main body 401 and a plurality of inclined wall 403, is used for fabricating other elements of the bottom-lighting module 30 on it. The plurality of inclined wall 403 extends upward from an edge of the main body 401 and supports the diffuser plate 36. Within a room space enclosed by the diffuser plate 36 and the bezel 40, the plurality of lamp 34 is disposed inside the bezel 40 and above the main body 401. Considering that the plurality of lamp 34 is the major heat source in the bottom-lighting module 30, the plurality of lamp 34 is not in touch with the main body 401. Instead, lamp supporters (not shown in FIG. 2) are disposed to hold the plurality of lamp 34.

Figure 3:
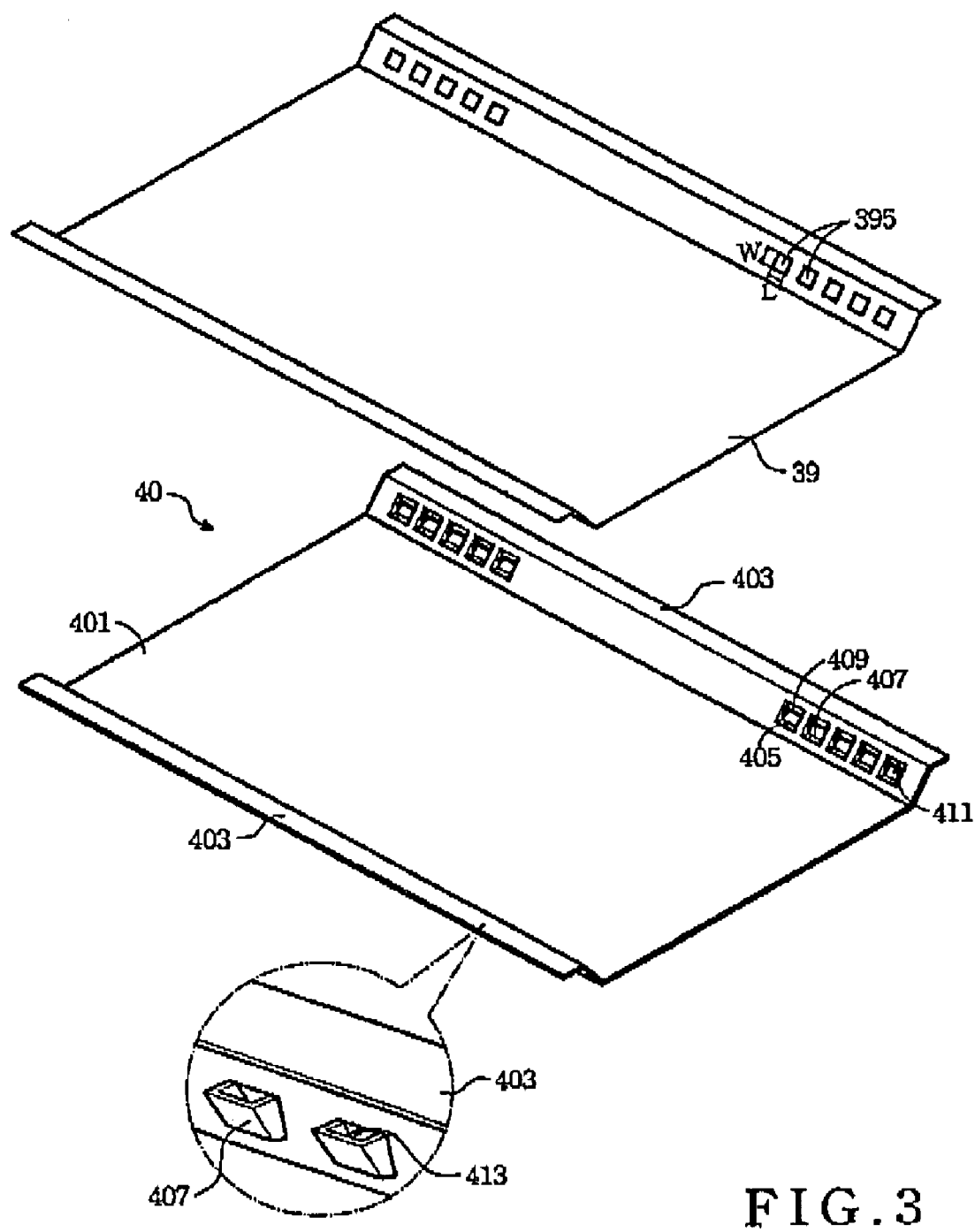
FIG. 3 is an exploded view of the bezel and the reflecting sheet according to FIG. 2.

As shown in FIGS. 2 and 3, the bezel 40 has at least one aperture 411 with a second circumference 409 and a first circumference 405. In this embodiment, each of the aperture 411 is formed at the inclined wall 403. At least one protrusion 407 is formed on the outer side of the bezel 40 for corresponding to the aperture 411 and shielding the aperture 411. Part of the circumference of the protrusion 407 corresponds to the second circumference 409 of the aperture. And, there is a predetermined gap 413, which exists between the second circumference 409 and the protrusion 407.

Through the aperture 411, the room space enclosed by the diffuser plate 36 and the bezel 40 is no more a closed space. In other word, an air-convecting tunnel is provided in the present bottom-lighting module 30. This air-convecting tunnel is helpful to the heat sink ability of the bottom-lighting module. Preferably, both of the opposite inclined walls 403 has the aperture 411 with the second circumference 409 and the first circumference 405 in order to convect the air or to remove the heat more efficiently.

And the structure of the protrusion 407 is capable of preventing external particles from entering the mentioned room space. Since the entering particle may defeat display quality of the LCD product, the predetermined gap 413 is designed to have a gap-width ranges from about 0.01 mm to about 2.5 mm. In practice, the structure of the protrusion 407, the first circumference 405, the second circumference 409, and the predetermined gap 413 can be formed by utilizing a punching machining process. For example, utilizing a "–" shape (minus sign shape) punching head to punching the processing bezel 40, for once, can readily form the entire structure of the mentioned protrusion 407, the first circumference 405, the second circumference 409, and the predetermined gap 413.

In one embodiment of the present invention, the bottom-lighting module 30 further comprises a reflecting sheet 39 disposed between the lamp 34 and the bezel 40. Or more precisely, the reflecting sheet 39 is disposed on a inner surface of the bezel 40, which is inside the room space. The reflecting sheet 39 can reflect the light generated from the lamp 34 to enhance light utilizing efficiency of the bottom-lighting module 30.

The reflecting sheet 39 has at least one aperture 395 corresponding to the at least one aperture 411 of the bezel 40, which has the first circumference 405 and the second circumference 409. The aperture 395 of the reflecting sheet 39 is of a slit shape and is smaller than the aperture 411 of the bezel 40. The aperture 395 of the reflecting sheet 39 has a length L ranging from about 1.5 mm to about 20 mm and a width W ranging from about 0.01 mm to about 2.5 mm.

At least part of the aperture 395 of the reflecting sheet 39 of the reflecting sheet 39 overlaps the aperture 411 of the bezel 40. Hence, even the reflecting sheet 39 is disposed to cover the inner surface of the bezel 40. The mentioned air-convecting tunnel can remain unobstructed. Preferably, the aperture 395 of the reflecting sheet 39 is smaller than the aperture 411. As shown in FIG. 2, generally, an external particle is hard to pass through the predetermined gap 413. In this embodiment, in which the aperture 395 of the reflecting sheet 39 is smaller than the aperture 411, parts of the reflecting sheet 39 can further stop the particle, once it passing through the predetermined gap 413.

Please refer to FIG. 3. FIG. 3 is an exploded view of the bezel and the reflecting sheet according to FIG. 2. In this embodiment, a "–" shape (minus sign shape) punching head is utilized to punch the bezel 40, for once, to form the structure of the protrusion 407 and the aperture 411 with the first circumference 405 and the second circumference 409. Accordingly, a portion of the bezel 40 is punched out and becoming the protrusion 407. An area on the inclined wall 403, which is corresponding to the punched portion, becomes the aperture 411. And the predetermined gap 413 is a penetrated portion, which is caused by the punching machining. As shown in FIG. 3, a plurality of mentioned aperture 411 is formed on the two opposite inclined walls 403. Correspondingly, same amount of aperture 395 of the reflecting sheet 39 is formed on the reflecting sheet 39 and locating at the positions that can overlap those aperture 411 after combination. Each of the aperture 395 of the reflecting sheet 39 is smaller than each aperture 411 of the bezel 40.

Figure 4:
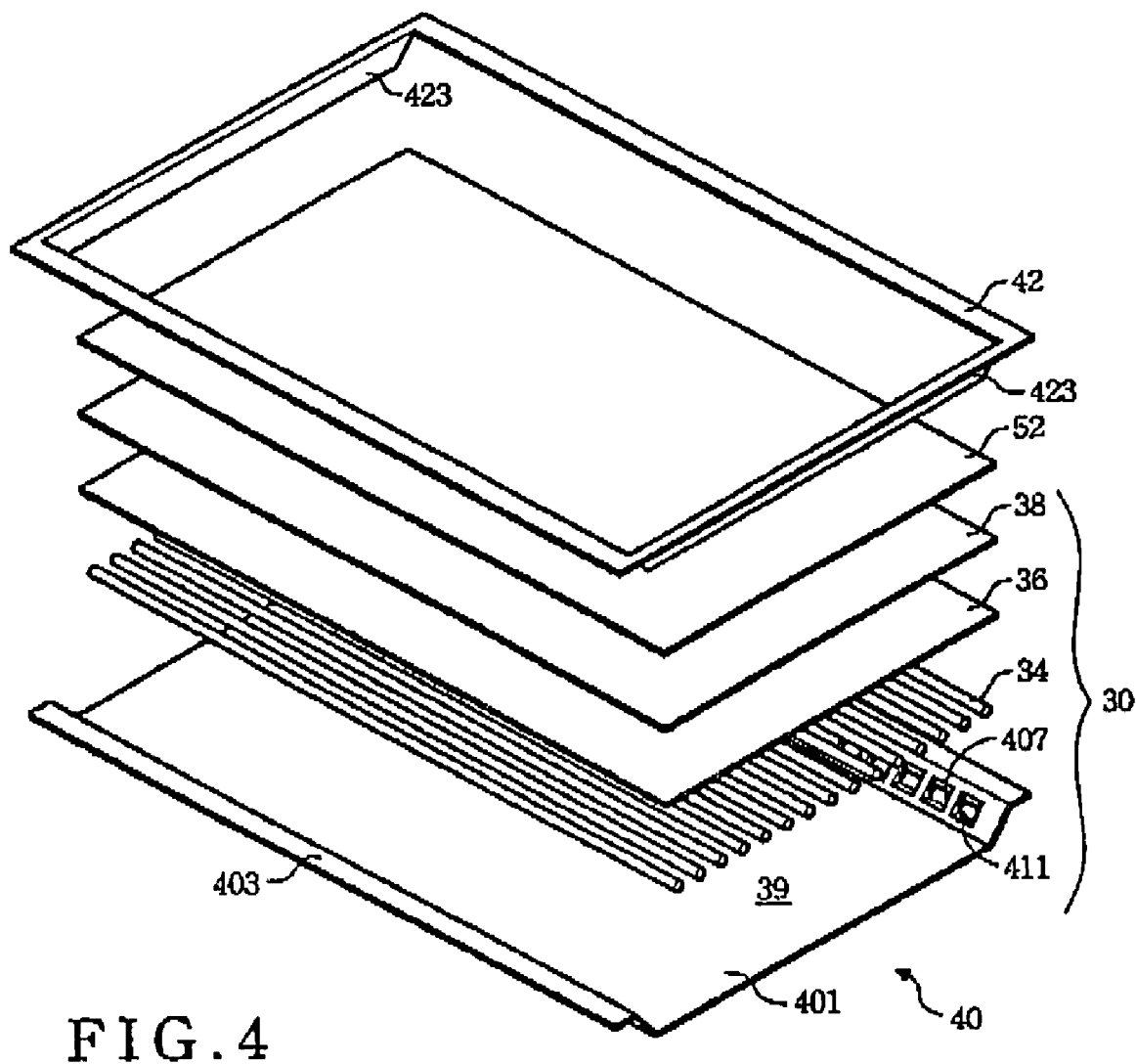
FIG. 4 shows an exploded view of the present bottom-lighting module according to one embodiment.

FIG. 4 shows an exploded view of the present bottom-lighting module according to one embodiment. A front bezel 42 and the display panel 52, such as a liquid crystal panel, are disposed above the bottom-lighting module 30. The bottom-lighting module 30 in order comprises the bezel 40, a plurality of lamp 34, the diffuser plate 36 and a plurality of optical thin film 38. The reflecting sheet 39 is disposed on the surface of the bezel 40. Functions of these element have been described above.

The bezel 40 is made from a metal plate. A punching machining method is utilized to bend the metal plate to form structures of the two inclined walls 403 shown in FIG. 4. Middle part of the metal plate serves as the main body 401 of the bezel 40. The two opposite inclined walls 403 can support the diffuser plate 36 and other above elements. The plurality of mentioned aperture 411 with the first circumference 405 and the second circumference 409 is formed on both inclined walls 403 to provide excellent heat sink ability. In case of particles entering the bottom-lighting module 30, two extending flank 423 of the front bezel 42 are jointed with the bezel 40 to form the room space of the bottom-lighting module 30.

Figure 5:
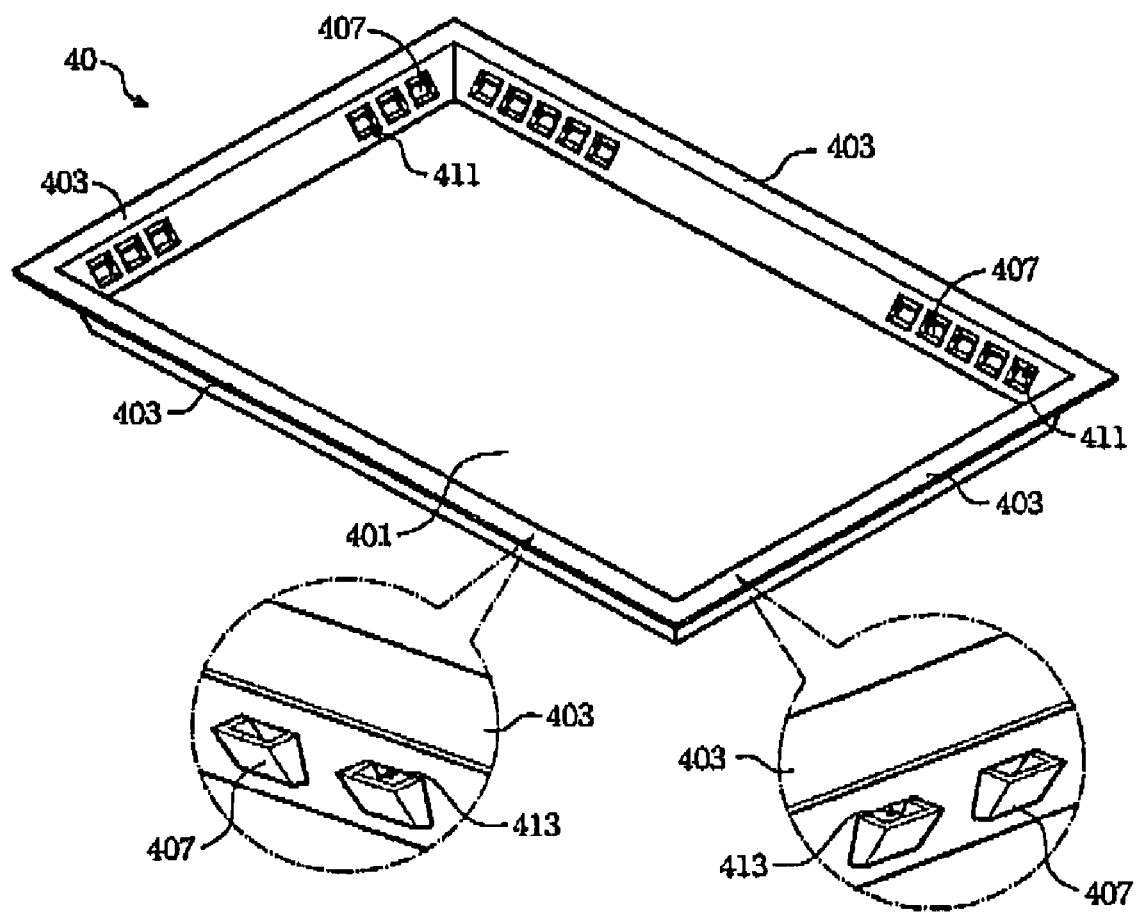
FIG. 5 shows a bezel according to one of the present embodiments.

Please refer to FIG. 5. It shows a bezel according to one of the present embodiments. Unlike the embodiments according to FIG. 3 or FIG. 4, the four sides of the main body 401 individually has an extending inclined wall 403. In other word, the bezel 40 is of a shallow basin structure in this embodiment. Aperture 411 and the attached protrusions 407 are disposed on all of the four inclined walls 403. Hence, the amount of the air-convecting tunnel is increased, and the sink ability of the bottom-lighting module 30 according to this embodiment becomes even remarkable.

Figure 6:
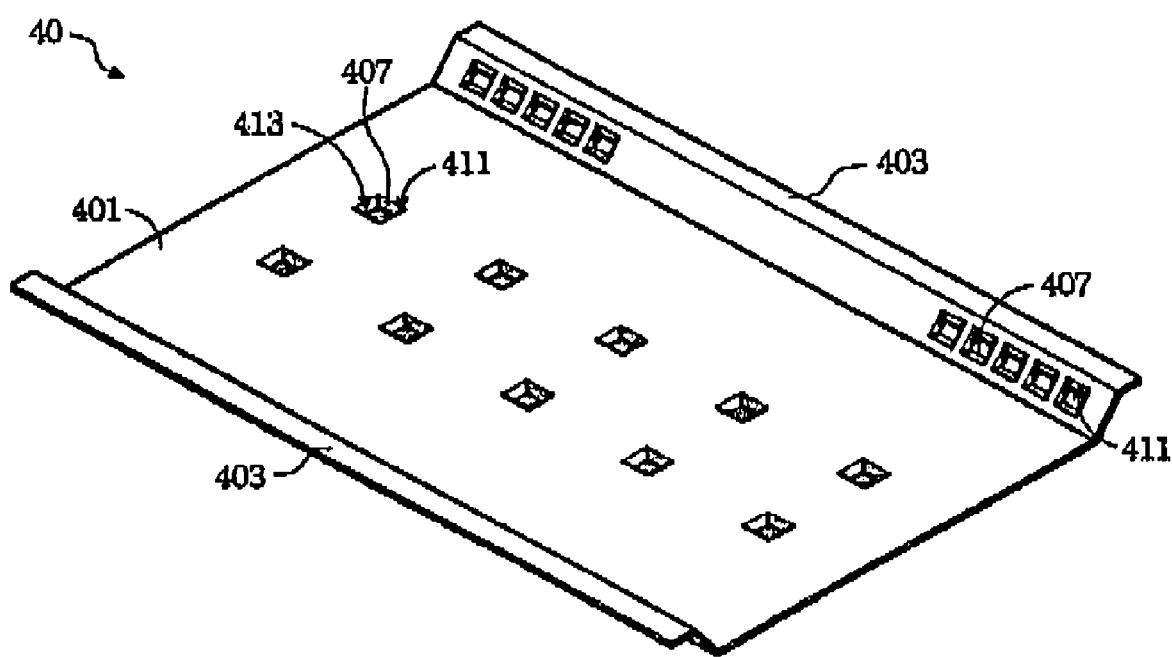
FIG. 6 shows a bezel according to one of the present embodiments.

Please refer to FIG. 6, It shows a bezel according to one of the present embodiments. Considering to further improve the heat sink ability of the present bottom-lighting module 30, apertures 411 are formed at the main body 401. The attached protrusions 407 are disposed outside the bezel 40 in positions that corresponding to each of the apertures 411.

Figure 7A:
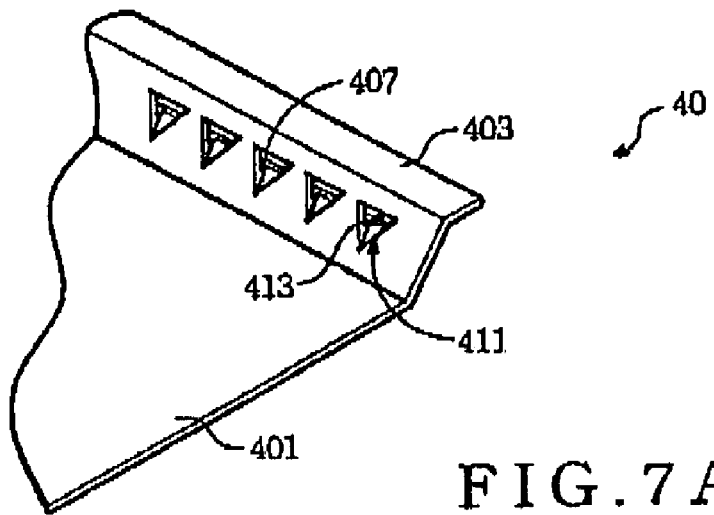
FIG. 7A shows a bezel according to one of the present embodiments.
Figure 7B:
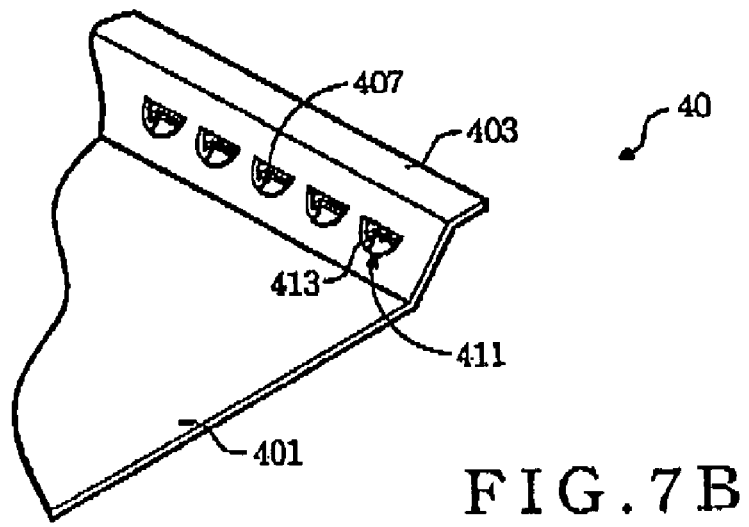
FIG. 7B shows a bezel according to one of the present embodiments.
Figure 7C:
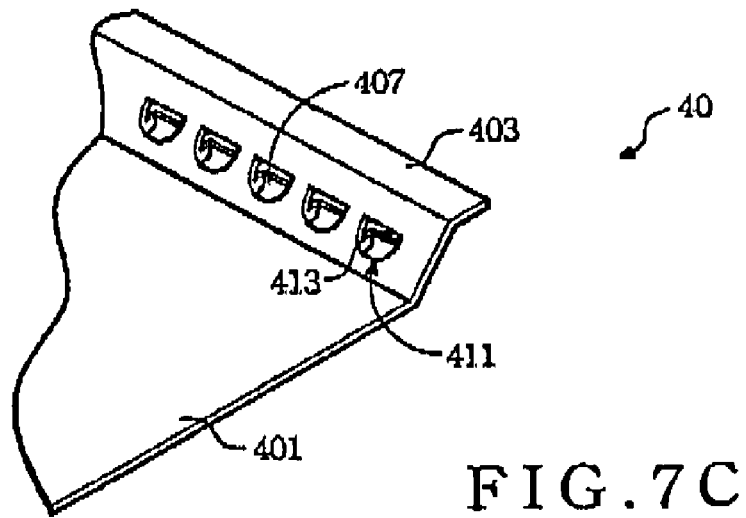
FIG. 7C shows a bezel according to one of the present embodiments.

Please refer to FIG. 7A, FIG. 7B and FIG. 7C. Beside the mentioned rectangular shape, the aperture 411 is formed as other shapes in embodiments according to FIG. 7A, FIG. 7B and FIG. 7C. As shown, the aperture 411 is of a triangle shape in FIG. 7A, a semicircle shape in FIG. 7B, and a polygon shape in FIG. 7C. These different shapes are formed by punching machining by utilizing corresponding punching head, individually. As same as the previous described embodiments, a surrounding-portion of the bezel 40, which surrounds the aperture 411, is divided into a first portion and a second portion. Even the shape of the aperture 411 changes, a protrusion 407 is disposed outside the bezel 40 in a position that corresponds to the aperture 411. Each of the protrusion 407 is connected with the first portion of the surrounding-portion of the bezel 40. And there is a second circumference between the second portion and the protrusion 407.

As the tendency of the LCD products that: 1) growing to bigger sizes/scales; 2) improving displaying brightness, both require more lamps in a LCD product, heat sink problems in the prior arts not only affects the function of LCD panel, causing the deterioration of display quality (i.e. some part of the displayed image turns out blurry and smudgy), but also decrease the life time of many kinds of internal element within the LCD product.

Therefore, the present invention comprising at least one air-convecting tunnel, which is constructed by the predetermined-gap 413, the protrusion 407, the aperture 413 of the bezel 40 and the aperture 395 of the reflecting sheet 39, is capable of removing the heat within the bottom-lighting module 30 with a remarkable efficiency.

Meanwhile, the present invention provides practical solutions to prevent external particles from entering the bottom-lighting module, particularly the room space between the bezel and the diffuser space. By the protrusion 407, the aperture 411 is not directly exposed to the external environment. The predetermined-gap 413 between the protrusion 407 and the inclined wall 403 has a gap-width, which is smaller enough to firstly obstruct external particles. Further more, the aperture 395 of the reflecting sheet 39 is smaller than the aperture 411, so the reflecting sheet 39 within the scope of the overlapping aperture 411 can also prevent the particles from entering.

Accordingly, a bottom-lighting module with high heat sink ability is thus provided. Under the tendency of the LCD products that: 1) growing to bigger sizes/scales; 2) improving displaying brightness, a bottom-lighting module according to the present invention is able to utilize more lamps without the prior drawbacks. Display quality of the LCD product can be maintained under continuously operating. Life time of the internal elements of the LCD product can be elongated. As a result, advantages provided by the present invention is obvious and remarkable.

While the present invention has been particularly shown and described with reference to a preferred embodiment, it will be understood by those skilled in the art that various changes in form and detail may be without departing from the spirit and scope of the present invention.

The invention claimed is:

1. A bottom-lighting module, comprising:
    a bezel having at least one aperture with a first circumference and a second circumference, the bezel comprising
    a main body, and
    at least one inclined wall extending upward from an edge of the main body;
    at least one protrusion formed on the outer side of the bezel corresponding to the at least one aperture and having at least two circumferences of the protrusion connecting with the bezel, wherein part of the circumference of the protrusion corresponds to the first circumference of the at least one aperture; and
    at least one lamp disposed on the main body of the bezel.

2. The bottom-lighting module according to claim 1, further comprising a reflecting sheet disposed between the bezel and the at least one lamp.

3. The bottom-lighting module according to claim 1, wherein the at least one protrusion and the bezel form a gap therebetween ranging from about 0.01 mm to about 2.5 mm.

4. The bottom-lighting module according to claim 2, wherein the reflecting sheet has at least one aperture corresponding to the at least one aperture of the bezel.

5. The bottom-lighting module according to claim 4, wherein the aperture of the reflecting sheet is smaller than the aperture of the bezel.

6. The bottom-lighting module according to claim 5, wherein the aperture of the reflecting sheet is of a slit shape.

7. The bottom-lighting module according to claim 6, wherein the aperture of the reflecting sheet has a length ranging from about 1.5 mm to about 20 mm and a width ranging from about 0.01 mm to about 2.5 mm.

8. The bottom-lighting module according to claim 1, wherein the aperture of the bezel is formed at the main body.

9. The bottom-lighting module according to claim 1, wherein the aperture of the bezel is formed at the inclined wall.

10. A bottom-lighting module, comprising:
    a bezel having at least one aperture with an orientation substantially perpendicular to the bezel, the bezel comprising
    a main body, and at least one inclined wall extending upward from an edge of the main body;

at least one protrusion corresponding to the at least one aperture and having at least two circumferences connecting with the bezel; and at least one lamp disposed on the main body of the bezel.

11. The bottom-lighting module according to claim 10, further comprising a reflecting sheet disposed between the bezel and the at least one lamp.

12. The bottom-lighting module according to claim 11, wherein the reflecting sheet has at least one aperture corresponding to the at least one aperture of the bezel.

13. The bottom-lighting module according to claim 12, wherein the aperture of the reflecting sheet is smaller than the aperture of the bezel.

14. The bottom-lighting module according to claim 12, wherein the aperture of the reflecting sheet is of a slit shape.

15. The bottom-lighting module according to claim 14, wherein the aperture of the reflecting sheet has a length ranging from about 1.5 mm to about 20 mm and a width ranging from about 0.01 mm to about 2.5 mm.

16. The bottom-lighting module according to claim 10, wherein the aperture of the bezel is formed at the inclined wall.

17. The bottom-lighting module according to claim 10, wherein the aperture of the bezel is formed at the main body.

* * * * *